United States Patent [19]

Rimbey

[11] 3,734,525
[45] May 22, 1973

[54] COLLAPSIBLE TRAILER
[75] Inventor: Donald H. Rimbey, Temple Terrace, Fla.
[73] Assignee: Helen A. Shook, Tampa, Fla.
[22] Filed: May 13, 1971
[21] Appl. No.: 143,009

[52] U.S. Cl. .......................... 280/30, 52/66, 296/27
[51] Int. Cl. ............................................. B60p 3/34
[58] Field of Search ................ 296/10, 27; 280/30, 280/37; 52/64, 66, 223, 228

[56] References Cited
UNITED STATES PATENTS

| 2,241,169 | 5/1941 | Yokes | 52/228 |
| 3,517,962 | 6/1970 | Bassett | 52/64 X |
| 2,461,577 | 2/1949 | Stark | 296/27 |
| 3,081,125 | 3/1963 | Petersen | 296/27 |
| R25,827 | 8/1965 | Bigelow | 52/66 X |
| 3,304,668 | 2/1967 | Edmonds | 296/27 X |

FOREIGN PATENTS OR APPLICATIONS

| 80,139 | 10/1955 | Denmark | 296/27 |
| 290,887 | 5/1969 | Australia | 52/66 |

Primary Examiner—Leo Friaglia
Assistant Examiner—Leslie J. Paperner
Attorney—Stefan M. Stein

[57] ABSTRACT

A trailer designed to be towed behind an automobile or the like and comprising a plurality of components including a base, side wall means surrounding the base, a top, a tow bar and a pair of spring loaded axis. The majority of the components which comprise the trailer are removably attached to the base or to one another such that each of the components may be disconnected from their assembled position and stored on the base of the trailer. The top and the base may be connected directly to each other to define a storage compartment in which the various components are placed such that the trailer may be shipped or transported by means other than towing.

11 Claims, 6 Drawing Figures

PATENTED MAY 22 1973 3,734,525

INVENTOR.
DONALD H. RIMBEY
BY *Law Offices of*
*Stefan M. Stein*
ATTORNEY.

INVENTOR.
DONALD H. RIMBEY
BY *Law Offices of Stefan M. Stein*
ATTORNEY.

COLLAPSIBLE TRAILER

BACKGROUND OF THE INVENTION

1. Field of the Invention

This invention relates to a collapsible trailer wherein a plurality of the components from which the trailer is formed may be disconnected from their assembled position and stored in a compartment defined by the top and base of the trailer.

2. Description of the Prior Art

In recent years, the use of trailers which are designed to be towed by conventional automobiles has become very popular for hauling various types of goods. A number of companies have gone into business of leasing these trailers to people who wish to transport goods over either a short or long distance. It is customary for the user of such a trailer to lease the trailer at one location, transport his goods to a second desired location and then return the trailer to the leasing company's agent at this second location. It is obvious in such a leasing type of arrangement that a plurality of trailers must be available at numerous locations throughout the country. To maintain an equal distribution of trailers it is often times necessary for a leasing company to transport the empty trailers to their various points of origin. Due to the structure and design of conventional trailers it has been the practice to transport these trailers by towing, in the same manner in which they were delivered by those utilizing the trailers. This of course is very expensive in that a number of towing vehicles must necessarily be maintained by the leasing company in order to tow the various trailers back to their place of origin. This expense is of course reflected in the amount of money charged one who desires to lease such trailers. Also, the additional hauling of the trailers results in reduced life of the trailer since it is being towed both to and from the place of origin.

In an effort to overcome the existing problems in conventionally designed trailers, an attempt has been made to design trailers to include collapsible portions which may be stored directly on the trailer base. However, such design has resulted in relatively complex structures which when disassembled and arranged in their shipping condition present a relatively bulky, and often times fragile package. These collapsible trailers therefore present additional problems associated with the shipping of such disassembled trailers which also add to the expense of returning these trailers to the point of origin.

Consequently, there is a need for a sturdy, reliable trailer having parts or components which may be disassembled and stored in a compact area in which the trailer components may be returned to the place of origin with reduced expense and trouble.

SUMMARY OF THE INVENTION

This invention relates to a trailer which has a plurality of removably connected components designed to be disconnected from their operable position and stored in a compact compartment formed by connecting the top of the trailer directly to the base.

More specifically, the trailer comprises a substantially planar base which has upwardly extending side wall means removably connected to the majority of its peripheral edge. The side wall means may comprise a plurality of sheets made from aluminum or any other acceptable material. The trailer further includes a fiberglass top having a substantially shell-like configuration wherein the sides of the top terminate an L-shaped flange. This flange is designed to removably engage the similarly shaped upper extremity of the side wall means. The side wall means further includes a door or the like which is removably mounted at the rear of the trailer and is removably connected to both the peripheral edges of the base and top in the same manner as the rest of the sheets comprising the side wall.

A tow bar is provided on the trailer, which is removably connected to the under carriage of the trailer in such a manner that it may be rigidly attached to the trailer to provide a safe means of towing.

The trailer further includes running gear which comprises a spring loaded full axle removably connected to the underside of the trailer approximately midway between the front and rear of the trailer. Conventional tires may be mounted on the wheels which are connected to this axle and the fact that the axle is spring loaded provides the trailer with a relatively smooth, cushioned ride.

When used to transport various goods, the trailer is towed between its original point and any desired point where the user of the trailer desires to deliver such goods. At this second distant point the trailer is then delivered to an agent of the leasing company. If it is desired to return the trailer to its point of origin, the trailer is disassembled and shipped back rather than being towed back in the same manner in which it was delivered. More specifically, the tires, the spring loaded axle and tow bar are all removably disconnected from their operative positions and arranged on the planar base of the trailer. Next, the side wall means including the rear door are removably disconnected from both the top and peripheral edge of the base and placed over the axle, tow bar and wheels. The side wall means are configured such that they may be arranged in a nested fashion over the other components already in place on the base of the trailer. Finally, the top of the trailer is placed over the components arranged on the base. The top is attached such that its peripheral edge is joined to the peripheral edge of the base. Consequently, a sturdy, compact storage compartment is formed to provide efficient and inexpensive shipping and/or storing of the trailer when not in actual use.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
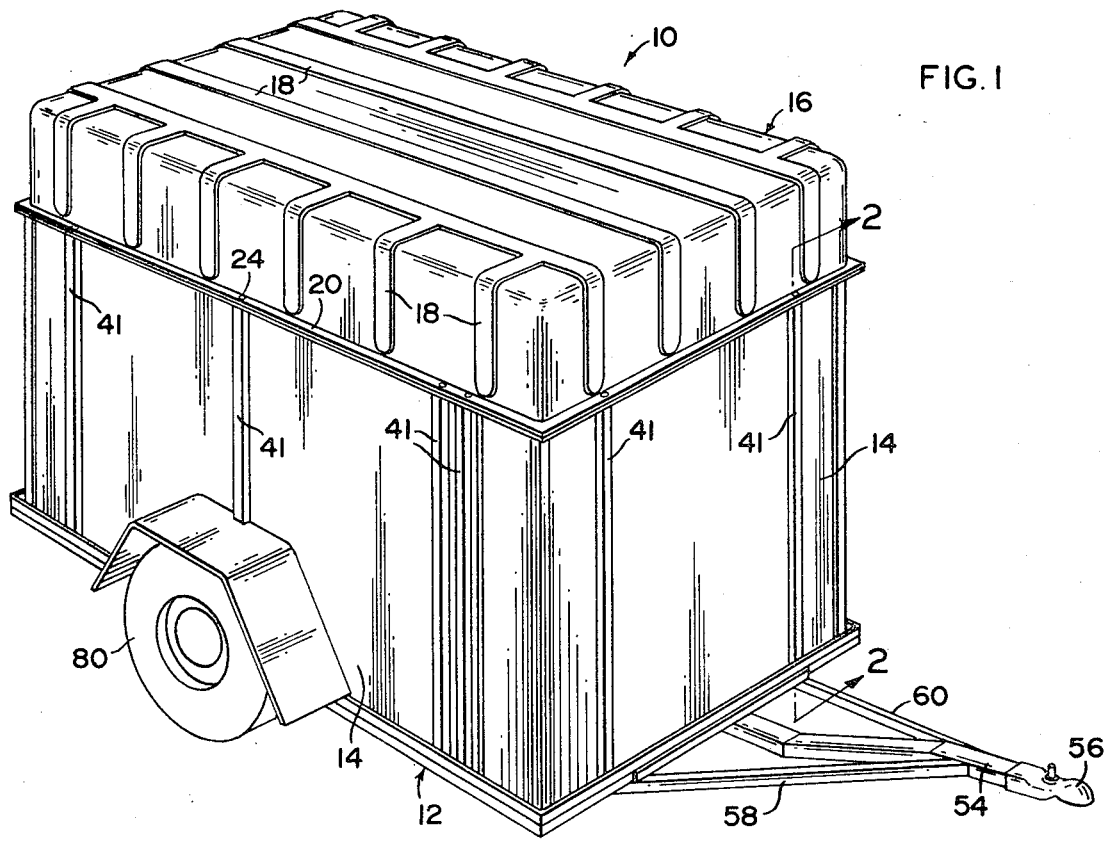
FIG. 1 is a perspective view of the trailer of the present invention in its assembled operable state.

As shown in FIG. 1, the trailer generally indicated at 10 comprises a substantially planar base 12 having side wall means 14 removably attached to its peripheral edge, as will be hereinafter explained. The trailer further comprises a top 16 having a substantially shell-like configuration and including a plurality of reinforcing ribs 18 integrally molded into the top. The walls of the top terminate in a substantially L-shaped flange designed to engage the upper extremity of the side wall means 14.

Figure 2:
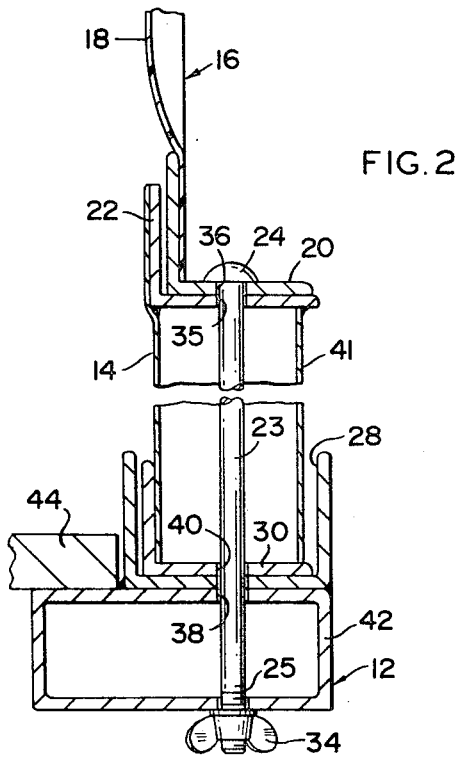
FIG. 2 is a sectional view taken along lines 2—2 of FIG. 1 showing the means of connecting the side wall to the top and base.

More specifically, as shown in FIG. 2, flange 20 is formed along the entire peripheral edge of top 16 and is designed to engage a similarly formed L-shaped flange 22 defined at the upper extremity of the side wall means 14. The top, side wall and base may be all removably connected together by any adequate means as shown in FIG. 2. In this particular embodiment a long tie bolt 23 including formed head 24 and threaded portion 25, located at opposite extremities thereof, interconnects all three pieces. As shown the peripheral edge of the base comprises a substantially U-shaped channel 28 designed to engage the lower extremity 30 of the side wall means 14. Bolt 23 extends through aligned apertures in flanges 20 and 22 of the top and side respectively and through apertures in flange 30, U-shaped channel 28 and hollow beam 42 of the base. A wing nut 34 or the like may be removably attached to the threaded end of the bolt to secure it in locking engagement with these elements. Hollow, vertically arranged tubes 41 act as stiffening means and also serve to enclose the tie bolts 23. It should also be noted that a planar surface 44 is also mounted on beam 42 and comprises the load bearing surface of the base.

Figure 3:
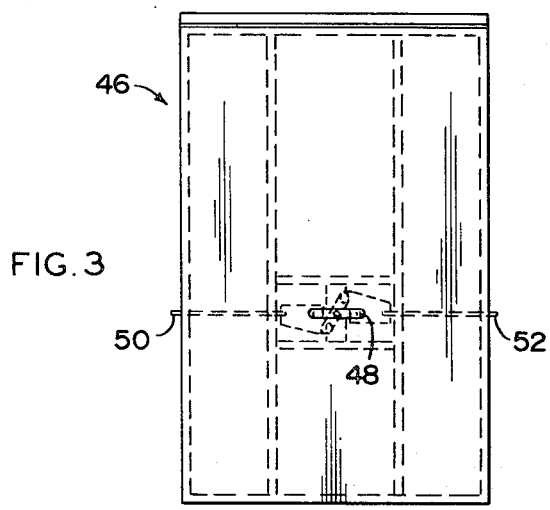
FIG. 3 is a front view of the rear door of the trailer.
Figure 4:
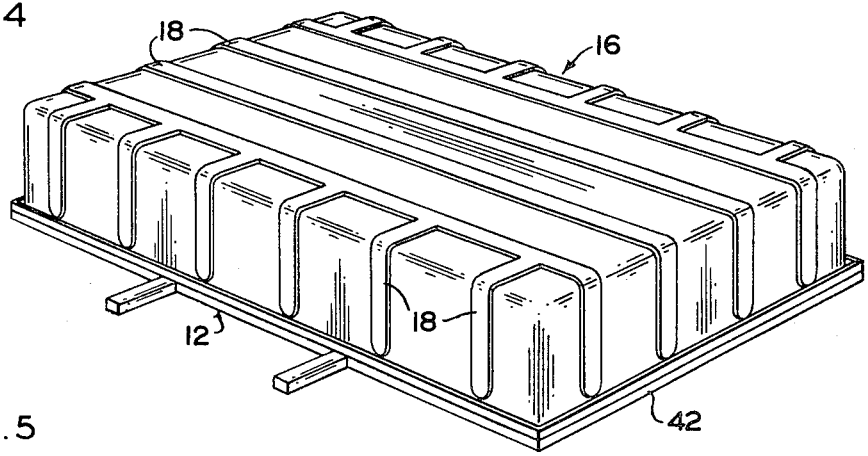
FIG. 4 is a perspective view of the trailer in its stored position.

FIG. 3 shows the rear door generally indicated as 46 which may be considered part of the side wall means 14. The rear door is connected to the rear of the trailer between the top 16 and the trailer edge of base 12 in a manner similar to that as explained with reference to the structure of FIG. 2. The door 46 includes a locking means which is essentially a conventional turn buckle. Rotating handle 48 operates two laterally moving slide bolts 50 and 52 for securing the door 46 in a locking or unlocked position.

Figure 6:
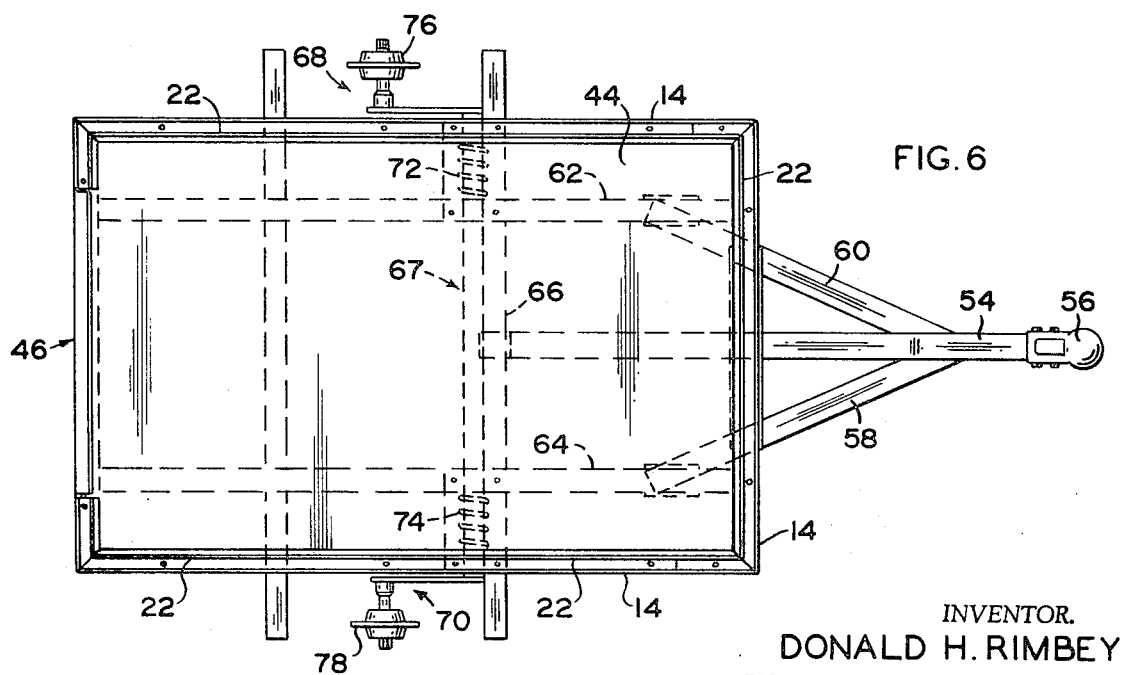
FIG. 6 is a top plan view of the trailer in its assembled operable state, prior to positioning the top thereon.

As shown both in FIGS. 1 and 6 a tow bar 54 is connected to the frame of the base and is arranged to extend outwardly from the front of the trailer so as to be positioned to be connected to a towing vehicle such as an automobile or the like. A conventional cup or socket 56 is provided to be used in cooperation with a conventional type hitch. Cross support beam 58 and 60 are welded onto tow bar 54 and the beams and main tow bar are removably connected to support beams 62, 64 and 66 respectively.

The running gear of the trailer is also depicted in FIGS. 1 and 6 and comprises a full axle assembly generally indicated at 67. The axle assembly is spring loaded at each end 68 and 70 by means of coil springs 72 and 74 which are arranged to provide an easier ride to the vehicle. Wheels 76 and 78 are mounted on the axle assembly. Conventional trailer tires 80 are mounted on the wheels.

Figure 5:
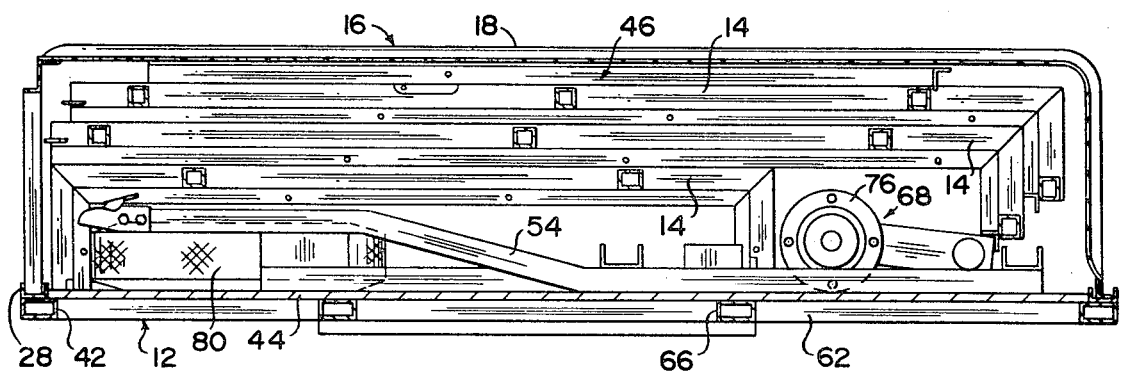
FIG. 5 is a sectional view showing the interior of the trailer and the components arranged in their stored position.

With the exception of the support beams 42, 62, 64, 66 and 67 and the planar surface 44, all of the components which comprise the trailer are removably attached either to one another or directly to the base itself. When desired, a trailer may be disassembled, by disconnecting each of the members. For storage or shipping, the respective components may than be arranged in any convenient manner on planar surface 44 of base 12. More specifically, the conventional tires 80, tow bar assembly 54, 56, 60 and spring axle assembly 67 may first be arranged on the planar surface 44 as shown in FIG. 5. Next, the individual sheet which make up the side wall means 14 are disassembled from both the peripheral edges of the top and base and arranged in nested fashion on the planar surface 44 in such a manner as to cover the components already arranged thereon. The side wall sheets are so configured so that they may be arranged in cooperative nested fashion in order to save additional space during storage and shipping. When all of the components are properly positioned, the top 16 is positioned over the assembled components so as to define a storage compartment with the base itself.

Referring back to FIG. 2 the top and base may be removably connected to one another in that flange 20 is specifically configured to cooperate with U-shaped channel 28 in the same fashion that the lower extremity of side wall means 14 cooperates. Any applicable connecting means may be extended through apertures 35, 36, 38 and 40 arranged in the peripheral edges, and beam 42 of the top and base respectively.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described,

What is claimed is:

1. A trailer comprising: a plurality of components including a base having a substantially planar platform, side wall means removably attached to said base, a top removably connected to said side wall means, a running gear assembly removably attached to said base in supporting relation thereto, tow means attached to said base so as to provide a means by which said trailer may be towed, said top and said base removably connectable to one another so as to define a container directly connected to one another in which each of said plurality of components may be collectively stored when disconnected from said vehicle, the upper peripheral edge of said base comprising a channel, said side wall means including an upper and lower edge both of which comprise an L-shaped configuration, said lower edge removably mounted within said channel, said top including a lower peripheral edge having an L-shaped configuration, said upper and lower edges of said wall means and said lower peripheral edge of said top each being correspondingly configured to one another, such that said lower edges of both said top and said wall means are removably attached in said channel, said configuration of said lower edge of said top and said upper edge of said wall means correspondingly configured so as to be removably connected to one another.

2. A trailer as in claim 1 further comprising connecting means for interconnecting to one another said top, base and side means.

3. A trailer as in claim 1 wherein said connecting means comprises a bolt engaging in locking relation cooperatively positioned portions of said top, base and side wall means, said bolt arranged to extend through both the lower peripheral edge of said top and the upper edge of said side wall means and having a sufficient longitudinal dimension to extend through the lower edge of said side wall and said channel.

4. A trailer as in claim 1 wherein both the lower peripheral edge of said top and the upper edge of said side wall means comprise a substantially L-shaped configuration including an outwardly extending flange arranged in supporting relation to one another.

5. A trailer as in claim 1 wherein said running gear comprises at least one spring loaded axle removably connected to the undersurface of said base, whereby said axle may be disconnected and stored on the planar surface of said base.

6. A trailer as in claim 1 wherein said running gear comprises a spring loaded wheel assembly removably connected to opposite extremities of said axle, whereby said wheel assemblies may be disconnected and stored on said base.

7. A trailer as in claim 1 wherein said tow means comprises a tow bar removably connected to the underside of said base and being of such a dimension as to be capable of being stored within the container defined by said base and said top.

8. A trailer as in claim 1 wherein said side wall means comprises a door removably attached to both said top and said base and including locking means for securing said door in a closed position.

9. A trailer as in claim 8 wherein said trailer comprises connecting means and further include support means comprising a plurality of hollow tube members directly engaging said side wall substantially along their entire length, said tubes configured to at least partially surround said connecting means when said top, side wall means and base are removably connected to one another.

10. A trailer as in claim 1 wherein strengthening means is formed in said top in spaced predetermined relation to one another.

11. A trailer as in claim 10 wherein said top has a substantially shell-like configuration wherein the volume of the container defined by said top and said base being connected to one another substantially equals the volume of said top, each of said strengthening means comprising indentation means integrally formed in said top.

* * * * *

UNITED STATES PATENT OFFICE
CERTIFICATE OF CORRECTION

Patent No. 3,734,525      Dated May 22, 1973

Inventor(s)    Donald H. Rimbey

It is certified that error appears in the above-identified patent and that said Letters Patent are hereby corrected as shown below:

Column 3, line 39, "stiffening" should read -- support --; line 39, after "means" insert -- to stiffen or support side walls 14 --.

Signed and sealed this 26th day of February 1974.

(SEAL)
Attest:

EDWARD M. FLETCHER, JR.
Attesting Officer

C. MARSHALL DANN
Commissioner of Patents